United States Patent Office 3,387,330
Patented June 11, 1968

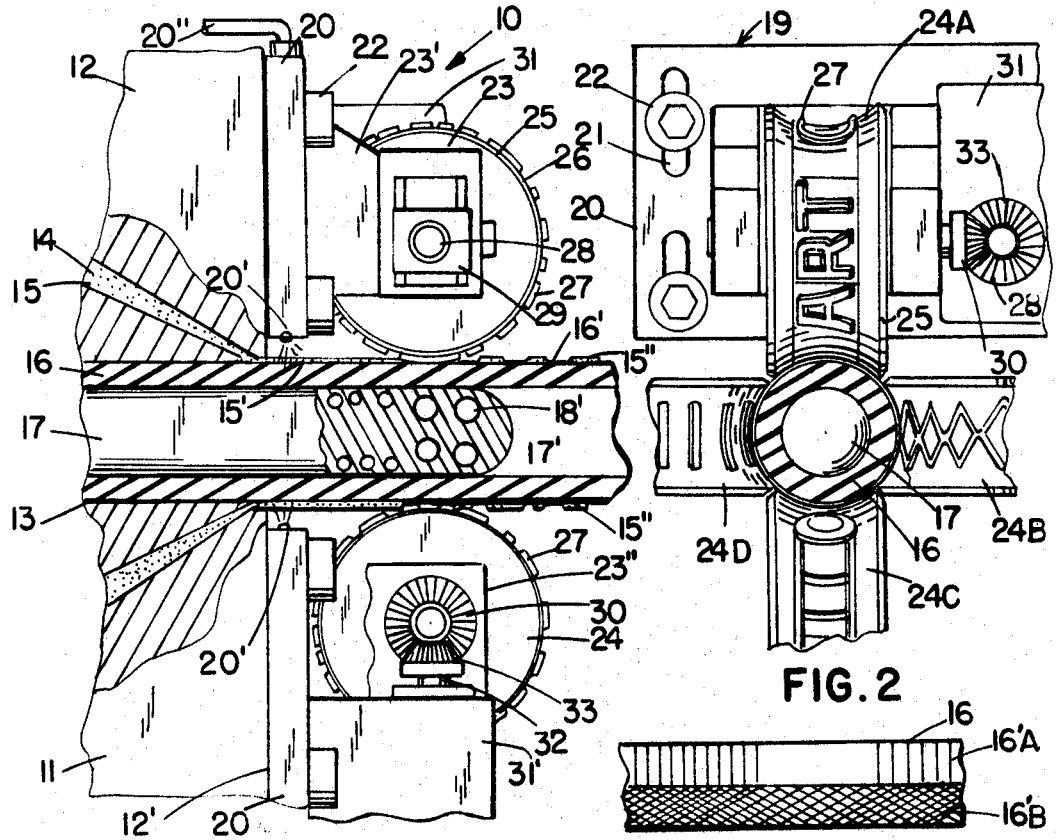

3,387,330
EXTRUSION APPARATUS AND METHOD
Jerome H. Lemelson, 85 Rector St.,
Metuchen, N.J. 08840
Continuation-in-part of application Ser. No. 142,405,
Oct. 2, 1961. This application June 8, 1964, Ser.
No. 373,482
3 Claims. (Cl. 18—13)

This invention relates to an apparatus and methods for embossing the surface or surfaces of an extrusion as it is formed and is a continuation in part of my co-pending application entitled Extrusion Apparatus and Articles Produced Therefrom, Ser. No. 142,405, filed Oct. 2, 1961 and copending application Ser. No. 703,523 entitled Apparatus for Making a Display Sheet which was filed on Dec. 18, 1957 and now Patent No. 3,146,492.

Various shapes of metal or plastic currently produced by extrusion are provided with a substantially smooth exterior surface, usually defined by the shape and condition of that portion of the extrusion die wall past which the material flows in forming to shape. If it is desired to decorate the extrusion, tools, printing or painting equipment are generally employed at a later stage in the fabrication of the material after it has been cut to length. This is particularly so for extrusions of hollow, tubular shape having thin walls which will buckle easily if external forces are applied thereto by an embossing tool and to other structural extrusions having portions which are incapable of resisting undesirable deformations or bending if a force is applied externally thereto by a tool such as an engraving or embossing tool.

This invention is particularly concerned with the embossing of such extrusions to provide both decorative and useful surface finishing and shaping and associated tooling which may be used for preventing or controlling the deformation or buckling of the extrusion as it is formed and so shaped. Accordingly it is a primary object of this invention to provide improved tooling and methods for post-shaping an extrusion as it is formed.

Another object is to provide an improved extrusion apparatus for forming tubular extrusions or the like and for deep embossing the surface thereof immediately after it is extruded without buckling or otherwise detrimentally effecting the extrusion.

Another object is to provide an apparatus and method for both shaping and cold working an extrusion as it is formed to change its shape and to improve the physical characteristics of the material being extruded.

Another object is to provide an improved method of working an extruding metal to improve its crystalline structure and predetermine its physical characteristics.

Another object is to provide an improved apparatus for changing the external shape of a tubular extrusion of metal or plastic as it extrudes.

Another object is to provide a multi-colored tubular extrusion and apparatus for blow molding said extrusion to provide the exterior surface thereof with decorations of different color than other portions of the surface thereof.

Another object is to provide improved apparatus for feeding an extrusion after it has left the extruder and automatically decorating same.

Another object is to provide improvements in apparatus and methods for cooling and solidifying an extrusion as it flows from an extruder.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention, as claimed.

FIG. 1 is a side view with parts broken away for clarity of an extrusion apparatus and embossing means operative on the extrusion after it leaves the extruder;

FIG. 2 is a front view of FIG. 1;

FIG. 3 is a view of a fragment of an extrusion;

FIG. 4 is a side view of apparatus of the type shown in FIGS. 1 and 2 modified to extrude solid shapes;

FIG. 5 is a side view of a modified embossing apparatus.

FIG. 1 illustrates a portion of an extrusion apparatus 10 including an extrusion of tubular shape being formed thereby and means for automatically emboss-decorating the exterior surface of the extrusion. The apparatus 10 includes an extruder 11 including a die portion 12 having a mandrel 17 centrally positioned within an opening 13 in the die for defining the interior surface of a tubular or hollow extrusion 16.

In a preferred form of the invention, the exterior surface of the extrusion is decorated by coating said surface with a thin coating or film of plastic or other suitable coating material and embossing or otherwise surface working the coating in a manner to cause it to become separated along portions thereof so that the material comprising the main portion of the extrusion is viewable through the embossings. Thus, if the main portion or body 16 of the extrusion is made of a plastic of a first color and is coated with a plastic of a second color, the surface of the resulting extrusion will be decorated in two colors; the coated material being visible to the eye of an observer where it is not separated or embossed while the first color is visible only in those areas where the coating is separated by embossing. However, in other forms of the invention, the apparatus illustrated may be utilized to provide decorative and functional embossings along the length of the extrusion as it extrudes without resort to multiple colors. By operating on a freshly extruded shape or formation as it is forced or is drawn from the extrusion machine, the need to re-thread and re-work the extrusion at a future time is eliminated and if the process is carried out continuously and automatically, problems of alignment and registration of the embossing means are eliminated.

In FIGS. 1 and 2, the principle illustrated in my said copending patent application, and issued patent is applied in which one or more surface forming or embossing tools cooperatively engage a freshly extruded formation in alignment with an extension of the mandrel over which the extrusion is formed and which defines the interior surface of the extrusion so as to prevent the extrusion from inwardly deforming or collapsing. A plurality of wheels or rotary embossing dies 23 and 24 are provided in FIG. 1 and are supported at the end of the extrusion chamber 11 in a manner to be adjustably engageable with the surface of the extrusion as it leaves the die and preferably while it is in the proper physical condition necessary to effect the desired physical changes in the extrusion to be described.

The main extrusion 16 which, in FIG. 1, is illustrated as a tubular member of rectangular cross-section, is shown exuding from the extrusion die 12 over the mandrel 17 and is coated on at least its upper and lower surfaces or portions thereof with a second material 15 shown flowing through one or more passageways 14 extending through the extrusion die 12 to the surface of the opening 13 near the end of the die opening. The extrusion material 14 is preferably of a different color than the material comprising the main extrusion 16 and may comprise essentially the same resin or a coating material of a different chemical composition than that comprising 16.

For most of the more common polymeric thermo-plastic, plastics such as polyvinyl-chloride, polyethylene, polypropylene, cellulose acetate, styrene or the like, the coating 15' is deposited preferably to a depth of .004 inch or less so that when the surface of said coating is deep embossed as illustrated, the coating will separate leaving a separation in the coating which will appear as a design in the color of the material of the base 16 of the composited extrusion. As stated, the coating may substantially cover the entire exterior surface of the extrusion 16 or may extend along band or strip areas thereof depending on the resulting effects desired. Coating is preferably effected while either or both materials are in a semi-molten condition so as to effect the integral adherence or coherence of both materials into a unitary structure. However, it is noted that the material comprising the coating 15' is preferably sufficiently solidified by the time the embossing wheel or drum is brought thereagainst so as to effect discrete separations in the coating material which remain separated as illustrated at indented portion 16' so that the material of the base 16 is clearly viewable and so that the coating material does not flow back into place to obscure those portions of the surface of the base 16 which are desired to be viewed and to effect a two color pattern along the surface of the composite extrusion.

In FIG. 1, two embossing dies 23 and 24 are shown rotationally supported on respective fixtures which are mounted against a face of the die or end of the extrusion chamber so as to position said embossing rolls against respective portions of the exterior surface of the composite extrusion in alignment with the end portion 17' of the mandrel 17 which projects beyond the end of the extrusion die, as illustrated. Thus, the mandrel 17 cooperates with the embossing rolls and supports the extrusion moving thereover against inward deflection and prevents its buckling under the force exerted by the embossing rolls, whereby the extrusion and/or coating may be deeply embossed.

Each embossing roll or wheel comprises a disc or cylindrical shaped base 25 having raised portions 27 disposed around the peripheral surface of base 25 and defining the designs to be embossed in the surface of the extrusion as it moves away from the extruder. Disposed between raised portions 27 are indentations 26 in the surface of the embossing wheel or drum which are shaped to leave portions 15" between the indented portions 16' of the extrusion.

While the embossing rolls may be free wheeling and driven to rotate as the result of engaging the surface of the moving extrusion, they are preferably power operated by the same or respective drive servos or motors. A single motor preferably powers the two or more embossing rolls engaging the surface of the extrusion 16 although in FIG. 1 two motors 31 and 31' are illustrated each driving a respective one of the embossing rolls 23 and 24. The motors are preferably operated in synchronism with the operation of the extrusion rate-of-flow servo driving the extrusion screw or piston or in response to a feedback signal derived in sensing the speed of the extrusion 16 such as by means of a wheel rotating thereagainst further downstream. The embossing wheel 23 is shown mounted on a fixture 23' in the form of a plurality of brackets extending from a base 20 which is bolted to the front face 12' of the extrusion die or chamber. A plurality of socket screws 21 retain base 20 against the face of 12.

In FIG. 1, the bearings 29 for the shafts 28 on which the embossing rolls are mounted are shown adjustably positionable so as to position the perimeter of the embossing roll at the desired location relative to the extrusion. However, the entire fixture assembly 19 including the base plate 20 may be radially positionable relative to the opening in the extrusion die by means of slotted holes 21 therein through which the mounting socket screws 22 extend.

The drive motor 31' includes an output shaft 32 having mounted at its end a bevel gear 33 which engages the teeth of a bevel gear 30 secured to the shaft 28 on which the embossing wheel is mounted for driving said wheel. Notation 23" refers to one of the brackets rotationally supporting the embossing wheel 24 off the mounting plate 20'.

In FIG. 2, there is shown a front view of a portion of an apparatus which is a modified form of that illustrated in FIG. 1 and in which a cylindrical extrusion 16E is engaged by four embossing dies 24A to 24D which are mounted either aligned with each other or staggered or aligned with the extended portion of the mandrel 18 and which cooperate to emboss separate portions of the exterior surface of the extrusion. These portions may each include a quarter of the surface of the extrusion or less depending on the coverage of the respective embossed portions of the dies. The raised portions 27 of die 24A are illustrated as alpha-numeric characters operative to emboss words or characters in the surface of the extrusion engaged thereby. Various of the designs for embossings are illustrated as extending around at least portions of the rotary dies 24B, 24C and 24D which are rotated so as to present the embossing surfaces of each at the speed of the extrusion, by the respective servo motors or a single drive means coupled to all four dies.

Further details of the apparatus illustrated in FIGS. 1 and 2 include cooling means in the form of passageways 18' extending through the end portion 17' of the mandrel 17 for the production of heat transfer fluid therethrough to cool and solidify the base extrusion 16 and the coating thereon to present it in the proper physical condition by the time it has reached the embossing dies. To further improve or hasten such solidification, a plurality of jets of fluid coolant are ejected against the surface of the coated extrusion as it leaves the die and are illustrated in FIG. 1 as exhausting from respective pasageways and openings 20' provided in the base plates 20 of the mounting fixtures. Fluid conducting lines 20" are operatively connected to the passageways in plates 20 and extend from a source of pressurized coolant such as air or other heat transfer fluid ejected at the proper temperature against the surface or surfaces of the composite extrusion.

FIG. 3 illustrates a portion of an extrusion extruded by means of the apparatus of FIGS. 1–5 showing how portions 16'A and 16'B of the surface of said extrusion may have the same or different embossed designs provided therein. For example, the portions 16'B has a hatched design rolled therein and, by the manner illustrated in FIGS. 1 and 2. This design consists of deep enough channels or separations in the coating which cross each other and allow the color of the base portion 16 to be viewed in contrast with those portions of the coating which are not so separated.

In FIG. 4, a plurality of embossing rolls 24A and 24B are shown aligned with each other so as to cooperate in providing embossings in respective upper and lower surfaces of a solid extrusion 16B after it has been removed from the extrusion die 12'. While the rotary embossing dies 24A and 24B may be mounted as in FIGS. 1 and 2 against the face of the extrusion chamber or die, they may also be mounted on a separate fixture provided at a suitable location downstream of the extrusion and may be power operated by a common drive means or separate servos to both emboss and drive the extrusion therethrough. Accordingly, in the embodiments illustrated in FIGS. 1–4, the extrusion itself may be driven from the extruder by means of the pressure applied to the extrusion material, the embossing rolls and/or auxiliary power driven conveying equipment such as a belt conveyor or puller mechanism.

The extrusion 16B is illustrated in FIG. 4 as comprising a base or core portion 16B' comprising the major portion of the extrusion having its entire exterior surface or band-like portions thereof coated with a coating material 15′B as described which material is separated in those portions engaged by the raised portions of the embossing rolls so as to allow portions of the base material 16B′ to be viewed from the exterior of the extrusion and to provide a two-color decorative effect. Here again, both embossing rolls are preferably power rotated so that their peripheral surface is traveling at the same velocity as the extrusion although either or both may be driven by the extrusion itself depending on its characteristics.

In FIG. 5, a single extrusion roll or die 27A is shown engaging the upper surface of a composite extrusion comprising a base portion 16B having a coating 15″ on the surface so engaged and adapted to be embossed and separated to provide a two-color design in the extrusion as described, the lower surface of the base portion 16B′. The extrusion 16B may have any suitable shape other than tubular along that portion which is engaged by the embossing guide. The lower surface of the extrusion is shown abutting and supported by a belt 55 which is driven in a closed loop path parallel to the extrusion after it has exuded from the extruder, over a plurality of rollers, two of which 36 and 37 are shown. Depending on the stiffness and degree of support afforded to the extrusion by the belt 35, which may be of any suitable material, the extrusion die may or may not operate in alignment with one of the rollers supporting the belt 35 to provide embossings in the upper surface of the extrusion. The embossings may be utilized to provide a decorative or functional pattern in the upper surface of a conventional extrusion or to provide a two-color design as described, in a multiple layer or coated extrusion.

The rolls 36 and 37 may be power driven to rotate at the speed of the extrusion to drive the belt or plate 35 at the same lineal speed as the extrusion or may be free wheeling if adapted to directly engage the bottom face of the extrusion itself. At least one roll 36 is preferably directly aligned with embossing roll 24A.

Multi-color effects may be provided by embossing completely through the thin surface coating provided along the entire exterior surface or portions of the surface of the extrusion as described. This procedure as well as that described above may include the use of multiple polymeric materials for the base and coating or wipe applied decorative material; colored inks applied to a plastic base; or combinations of metal, with plastic or other colorants provided by wiping or coating on the extruded metal as described. In either case, the embossings may be provided in the extruded metal shape per se or merely through the coating provided thereon.

In yet another form of the invention, extrusion apparatus of the type illustrated in FIGS. 1 and 2 may be operative to produce a tubular plastic extrusion having a base tube or parison coated with a plastic of a different color as described. The extrusion may be downwardly disposed and provided in a semi-molten state to define a parison applicable to blow molding or may be cut to predetermined length and utilized thereafter as a parison upon reheating for the so-called blow-molding thereof to a predetermined shape into the cavity of a mold clampingly engaging both ends of the parison during blowing. The walls of the mold may be so shaped as to cause portions of the coating material 14 to separate when blown against said shaped mold portions and to thereby selectively expose portions of the base portion 16 of the extrusion which are of a different color than the plastic coating the exterior of the parison. Coating thicknesses may range from a mil or less to several mils or more depending on the desired effects, plastics employed, etc. The mold portions operative to effect separation of the coating engaged thereby protrude from the adjacent portions of the mold wall as ridges and/or indentations of tapered or V cross sectional shape, and may be utilized to provide various decorations in the shape of outline figures, alpha-numeric characters or designs of regular or irregular shape. In certain instances, the outer edging of the ridges or indentations so formed in the mold walls may be sharp or knife-like. The outer coating provided on the parison or extrusion is preferably sufficiently solidified by the time the mold is opened to prevent said coating from refilling the separations therein made by the ridge-like formations or steps in the mold wall. In other words, sharp inflections in the contour of the mold wall may also be operative to separate or sufficiently reduce the thickness of the coating to permit the material therebeneath to be seen from the exterior of the blow molded shape. Formations of ceramic, glass or metal may be similarly coated, formed to shape in a die or mold and decorated by indenting and separating portions of the coating or outer layer.

The rolls of FIGS. 1 and 4 may be positioned as illustrated or further downstream of the extruder to receive the freshly extruded metal, ceramic or plastic and perform other operations thereon in addition to extrusion. For example, one or more pairs of rolls may be utilized to coat the extrusion with the described material(s) for the decorative embossing thereof by further rolls positioned downstream of the coating rolls. The coating may be calendered or roller coated on the freshly extruded material along the entire or selected portions of its surface. Said material may also be powdered polymeric, ceramic or metal materials which is applied by means of rollers to the entire or selected areas of the extrusion and bonded thereto by fusion and/or pressure means resulting from rolling. The heat of the freshly extruded material may be operative to melt the powdered particles into a uniform coating or heat may be conducted through the rolls or by external means downstream of the rolls.

I claim:

1. Apparatus for embossing surface patterns in extrusions as they are continuously fed from an extrusion die comprising in combination with an extruder including means for expressing a material therefrom to a predetermined shape, means for coating the exterior of said extrusion with a material having a different color than the material comprising the base of the extrusion, an embossing means disposed for receiving the extrusion, said embossing means having at least two rolls adapted to engage substantially equal areas of the opposite faces of said extrusion and to exert equal pressures thereon so as not to axially deform the extrusion in passing between said rolls, at least one of said rolls having a surface shaped for embossing the surface of said extrusion and means for power rotating said embossing roll at substantially the same speed as the speed of said extrusion for operating said roll to separate the coating material in an embossed pattern so that the color of the base extrusion shows through the coating material.

2. Apparatus for embossing surface patterns in extrusions as they are continuously fed from an extrusion die comprising in combination with an extruder including means for expressing two materials of different color to a predetermined shape, one of said materials being coated on at least a portion of the surface of the other material, an embossing means disposed in line with said extruder for receiving the extrusion and including at least two rolls adapted to engage opposite faces of said extrusion and to exert equal pressures thereon so as not to axially deform the extrusion in passing between said rolls, at least one of said embossing rolls engaging at least a portion of the coating material and operative to separate portions thereof in accordance with a given pattern whereby the extrusion material beneath said coating material is visible.

3. Apparatus for embossing surface patterns in extrusions as they are continuously fed from an extrusion die comprising in combination with an extruder including means for expressing a metal therefrom to a predetermined shape, an embossing means disposed in line with said extruder for receiving the extrusion, said embossing means including at least two rolls adapted to engage substantially equal areas of opposite faces of said extrusion and to exert equal pressures thereon so as not to axially deform the extrusion in passing through said rolls, means for power rotating said embossing rolls and operating said rolls to cause them to emboss the extrusion and exert a longitudinal force on the extrusion to cause said extrusion to be stretched to thereby straighten said extrusion and to eliminate bends and bowing from the extrusion.

References Cited

UNITED STATES PATENTS

| | | | |
|---|---|---|---|
| 345,539 | 7/1886 | Pfannkuche | 18—14 |
| 2,501,690 | 3/1950 | Pendergast | 18—13 X |
| 2,867,001 | 1/1959 | Lewis et al. | |
| 2,902,716 | 9/1959 | Colombo | 18—14 |
| 3,024,494 | 3/1962 | Szphila | 18—14 X |
| 3,102,303 | 3/1963 | Lainson | 18—14 |
| 1,440,007 | 12/1922 | Freeman et al. | 18—12 X |
| 1,374,584 | 4/1921 | Knecht | 18—14 |
| 1,956,575 | 1/1934 | Hinskey. | |
| 2,137,887 | 11/1938 | Abbott | 18—14 X |
| 2,512,844 | 6/1950 | Weber | 18—14 |
| 2,708,772 | 5/1955 | Moncrieff | 18—14 X |
| 2,726,922 | 12/1955 | Moncrieff | 18—14 X |
| 2,765,153 | 2/1956 | Grelow et al. | 18—12 X |
| 2,802,237 | 8/1957 | Davis | 18—12 X |
| 2,809,393 | 11/1957 | Hauptman | 18—13 |
| 2,903,743 | 9/1959 | Lysoby | 18—14 X |
| 3,184,788 | 5/1965 | Serrano | 18—21 |
| 3,184,791 | 5/1965 | Gamble et al. | 18—14 |
| 2,645,819 | 7/1953 | Pouzet | 264—172 |
| 2,790,202 | 4/1957 | Lorenian | 264—172 |
| 3,141,913 | 7/1964 | Edwards | 264—284 |

FOREIGN PATENTS 450,947   1/1913   France.

WILLIAM J. STEPHENSON, *Primary Examiner.*

ROBERT F. WHITE, *Examiner.*

M. R. DOWLING, *Assistant Examiner.*